(12) United States Patent
Hulse

(10) Patent No.: US 6,419,379 B1
(45) Date of Patent: Jul. 16, 2002

(54) VEHICLE CENTER CONSOLE WITH INTERIOR ILLUMINATION

(75) Inventor: George Robert Hulse, Cookeville, TN (US)

(73) Assignee: Federal-Mogul World Wide, Inc., Southfield, MI (US)

(*) Notice: Subject to any disclaimer, the term of this patent is extended or adjusted under 35 U.S.C. 154(b) by 0 days.

(21) Appl. No.: 09/705,427

(22) Filed: Nov. 4, 2000

Related U.S. Application Data

(60) Provisional application No. 60/163,631, filed on Nov. 4, 1999.

(51) Int. Cl.⁷ .................................................. B60Q 1/00
(52) U.S. Cl. ........................ 362/488; 362/27; 362/154; 362/511
(58) Field of Search ................................ 362/488, 489, 362/482, 483, 27, 511, 101, 154

(56) References Cited

U.S. PATENT DOCUMENTS

| | | | |
|---|---|---|---|
| 4,202,030 A | 5/1980 | Kimura | 362/61 |
| 4,254,452 A | 3/1981 | Switala | 362/154 |
| 4,446,508 A | 5/1984 | Kinzie | 362/31 |
| 4,958,263 A | 9/1990 | Davenport et al. | 362/32 |
| 5,149,186 A | 9/1992 | Matsuno et al. | 362/75 |
| 5,206,562 A | 4/1993 | Matsuno et al. | 315/77 |
| 5,452,186 A | 9/1995 | Dassanayake | 362/80 |
| 5,647,657 A | 7/1997 | Damasky et al. | 362/32 |

*Primary Examiner*—Sandra O'Shea
*Assistant Examiner*—John Anthony Ward
(74) *Attorney, Agent, or Firm*—Reising, Ethington, Barnes, Kisselle, Learman & McCulloch, P.C.

(57) ABSTRACT

A center console assembly for mounting in a vehicle between the driver and front passenger seats to provide occupant conveniences and interior illumination. The user conveniences include storage trays, cupholders, a main storage bin, and an armrest. The assembly includes an illumination system for illumination of the user conveniences at the console, as well as illumination of external vehicle interior components and regions, such as the driver and front passenger seat buckles and the front and rear occupant foot wells. The illumination system uses at least one light source and one or more waveguides to route light within the console so that multiple lighting functions can be obtained using a small number of individual light sources. The external components and areas are illuminated via side openings in the console, which permits the illumination system to be completely housed within the console so that no external routing of light is necessary.

25 Claims, 1 Drawing Sheet

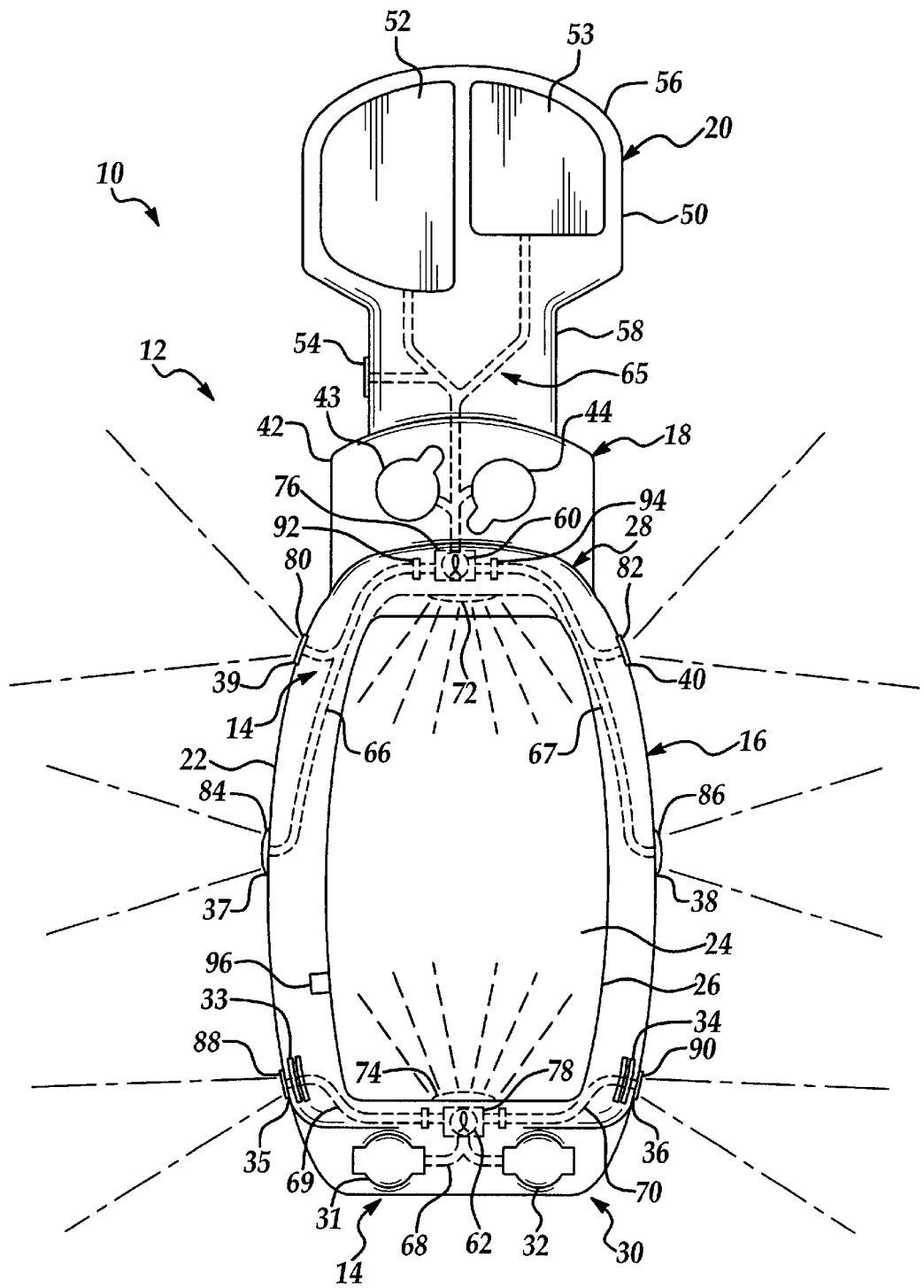

VEHICLE CENTER CONSOLE WITH INTERIOR ILLUMINATION

CROSS REFERENCE TO RELATED APPLICATION

This application claims the benefit of the priority of U.S. Provisional Application No. 60/163,631, filed Nov. 4, 1999.

TECHNICAL FIELD

This invention relates to vehicle interior illumination and to center consoles used within passenger vehicles to provide user conveniences such as storage bins, cupholders, and armrests.

BACKGROUND OF THE INVENTION

For many years, many different types of passenger vehicles have come equipped with center consoles as either optional or standard equipment on the vehicle. These center consoles are typically installed at a central location within the vehicle most commonly between the driver and front passenger seating. These center consoles provide user conveniences such as, for example, open storage trays for holding small objects, cupholders, an arm rest support, and a closed storage bin for personal effects. See, for example, U.S. Pat. No. 4,202,030 to M. Kimura which discloses a floor mounted vehicle console that includes an open storage tray and a storage bin having a hinged lid. As shown in the Kimura patent, it is known to incorporate illumination into the console, with the Kimura system including a removable illumination device that can be removed from the console and utilized at various locations within the passenger compartment.

For purposes of vehicle interior lighting more generally, U.S. Pat. No. 5,647,657 to J. Damasky et al. discloses a light system that uses a light-creation unit and light conductors to route light to a plurality of different interior locations for illumination of various vehicle components and areas. For example, the system can include a general illumination function group that uses a single light-creation unit to provide illumination of a door handle, a door lock, a belt buckle, storage receivers, a window handle, a hand brake, an ashtray, a gear lever, a level regulator, foot space, a holding handle, and a sunroof. While enabling a large number of lighting functions to be accomplished using a single light source, interior distributed lighting systems of the type disclosed by Damasky et al. are generally not cost-effective and consequently are not commonly used. The high cost results in part because of the complicated fiber optic (light conductor) harness that must be installed and routed all over the vehicle between different interior components and systems.

Accordingly, it is a general object of this invention to provide a vehicle interior lighting system that can provide a number of interior lighting functions without the high cost associated with many of the currently-known distributed lighting approaches. It is also an object of this invention to provide such a lighting system within a vehicle center console.

SUMMARY OF THE INVENTION

In accordance with the present invention, there is provided a center console assembly that includes a console with an illumination system disposed therein. The console has a receptacle positioned at a first location on the console and it also has an opening positioned at a second location on the console, with the opening being located such that, when the console is installed within the interior of a vehicle at the central location, the opening is oriented relative to a vehicle interior component so as to permit direct illumination of the interior component from light exiting the opening. This opening can be located to provide, for example, internal illumination of a storage bin located within the console, or external illumination of a different vehicle component such as a foot well or seat buckle. Similarly, the receptacle can be, for example, a storage bin, open storage tray, cupholder, or an electrical socket for such things a power connector or data port for a cellular phone or other electronic equipment.

The illumination system includes a light source and at least one waveguide that is optically coupled to the light source for routing of light within the console. The light source is positioned within said console to provide illumination at one of the first and second locations, and the waveguide extends away from the light source toward the other of the first and second locations to thereby conduct the received light toward the other location.

The light source can be used to provide direct illumination of an interior component or area at the first or second location, with the waveguide then routing a portion of the light to the other location. Alternatively, a second waveguide can be used so that each of the two locations receive light routed through a different one of the two waveguides. Additional openings can be used to provide illumination of a larger number of interior components are areas. Also, additional waveguides can be used to carry light to a larger number of different locations.

BRIEF DESCRIPTION OF THE DRAWINGS

Preferred exemplary embodiments of the invention will hereinafter be described in conjunction with the appended drawing, which is a top view of a preferred embodiment of a center console constructed in accordance with the present invention.

DETAILED DESCRIPTION OF THE PREFERRED EMBODIMENT

With reference to the FIGURE, there is shown a vehicle center console assembly 10 which is used to provide user conveniences and illumination within the interior of a passenger vehicle. Although console assembly 12 is designed to be installed in a central location between the front driver and passenger seats, it will be appreciated that it can be utilized in other areas within the passenger compartment, such as between or beside rear seating within the vehicle. Console assembly 10 includes a console 12 and an illumination system which is designated generally as 14. Console 12 includes a main bin section 16, a front cupholder section 18, and a front tray section 20. The main bin section 16 acts as the primary structural framework for console 12 and additionally provides user conveniences, such as cupholders for rear passengers and storage space. The front cupholder and front tray sections 18, 20 are each mounted forward of main bin section 16, and provide front cupholders and storage trays, respectfully. As will be described below, the illumination system 14 includes various optical components which are mounted throughout console 12, and these components are used to provide illumination of various components of the console as well as certain surrounding components and areas that are external of the console.

The main bin section 16 includes a main housing 22, a main storage bin 24, a storage bin lid 26, forward end 28, rearward end 30, rear cupholders 31 and 32, rear vents 33 and 34, and light openings 35–40. As seen in the FIGURE, main bin section 16 is of a generally oval shape, with its forward end 28 facing the front of the vehicle and its rearward end 30 facing the rear of the vehicle and protruding slightly into the back seat area. Main housing 22 forms the structural body of main bin section 16 and is open in the center to define the dimensions of main storage bin 24. Housing 22 can be constructed from a rigid, opaque plastic material thereby providing a structural foundation for console 12 and concealing the contents therein. Storage bin 24 is a storage receptacle which is deep enough to accommodate an assortment of items, and could contain additional features such as coin dispensers, removable trays, and audio or video players. Storage bin lid 26 is mounted by a hinge (not shown) to the top of housing 22 and preferably has a padded top surface which can act as an armrest for front seat occupants. It should be appreciated that hinges for lid 22 could be fastened in a number of different locations, such as on forward end 28, rearward end 30, or the lengthwise sides of housing 22, each of which would affect the direction in which lid 26 pivots.

Rear cupholders 31 and 32 are shown as separate cupholders and it will be appreciated that they could be instead implemented as a cluster of two cupholders integrated together to form a single receptacle. Cupholders 31 and 32 are located on rearward end 30 where they are accessible to occupants of the rear or middle row seats of the vehicle. Rear vents 33 and 34 are mounted on both the driver and passenger sides of console 12, and deliver HVAC air to those behind the driver and front passenger seats. Vents 30 can be adjustable as to the direction, amount of airflow, and other parameters which are common in the art, and can be located in other rear locations on the console, such as above or underneath cupholders 31 and 32.

Light openings 35–40 are openings in main housing 22 which allow light from within main bin section 16 to escape and illuminate the surrounding areas. Openings 35 and 36 are located on the outer surface of rearward end 30, below their associated vents 33 and 34, and these openings are used by illumination system 14 to supply light to the foot wells behind the driver and front passenger seats, respectively. Openings 37 and 38 are located on the outer surface of housing 22, nearly halfway between forward end 28 and rearward end 30, and these openings are used in providing illumination of the driver and front passenger seat buckles. Openings 39 and 40 are located proximate forward end 28 and are used in providing illumination of the driver and front passenger foot wells.

Front cupholder section 18 includes a cupholder housing 42 which, if desired, can be a unitary or integral portion of the main bin section 16. Cupholder housing 42 includes two receptacles in the form of cupholders 43 and 44. Housing 42 can be formed from a rigid or resilient, flexible plastic, depending upon the amount of structural stiffness required for a particular application. Although two separate cupholders 43 and 44 are shown, it will be appreciated that one or more additional cupholders could be included and that these front cupholders can be integrated together rather than being entirely separate as shown. Furthermore, if desired, the cupholders can have non-equal diameters, in which case they would therefore be able to receive different sized cups.

Front tray section 20 provides conveniently-accessible open storage of small items. It comprises a storage tray housing 50 which includes three receptacles in the form of a primary storage tray 52, a secondary storage tray 53, and an electrical socket 54. Housing 50 is generally an elongated member with a widening forward end 56 located nearest the front of the vehicle. Forward end 56 outwardly diverges from a narrower rearward end 58 to accommodate the primary and secondary storage trays 52 and 53, which are oriented side by side. As with the cupholder housing 42, storage tray housing 50 can be formed from a rigid or resilient, flexible plastic. The upper surface of housing 50 defines the shape and dimensions of storage trays 52 and 53, which are rather shallow in comparison to storage bin 24. Electrical socket 54 can be, for example, a standard cigarette lighter socket used to supply 12V power for purposes of a cellular phone or other electronic equipment. Alternatively, it can be a communications port for data or voice communications. Electrical socket 54 is mounted on a side wall of housing 50 near its rearward end 58. Although not shown, rearward end 58 can include other user conveniences in the region between storage trays 53, 54 and cupholders 43, 44.

Illumination system 14 delivers light throughout the console 12 and to the surrounding areas via light sources 60, 62 and waveguides 65–70. The light sources includes a front light source 60 and a rear light source 62. Any of a wide range of suitable light producing elements can be used for these light sources, such as LEDs, incandescent bulbs, discharge lamps, etc. Each of these light sources are optically coupled to at least one of the waveguides 65–70, which deliver the light to the desired interior component or area within the vehicle interior. The group of waveguides includes a front central waveguide 65, a driver's area waveguide 66, a front passenger waveguide 67, a rear central waveguide 68, a rear left passenger waveguide 69, and a rear right passenger waveguide 70.

Light source 60 provides the illumination needs for the driver and front passenger user conveniences, as well as for the front seat buckles and foot wells. It is mounted within console 12 at a concealed location near the forward end 28, proximate an opening that permits direct illumination of the storage bin 24 via a transparent lens or window 72. As used herein, "direct illumination" means illumination from the light source that is not routed via internal reflection through a waveguide, but that directly impinges upon an object, albeit in some instances after being diffracted through one or more lenses or windows. Rear light source 62 provides the illumination needs for the rear or middle row passenger user conveniences, as well as for the foot wells behind the front seats. It is mounted within console 12 at the rearward end 30 proximate an opening that permits direct illumination of the storage bin 24 via a transparent lens or window 74. Access to the light sources 60 and 62 can be obtained by removal of their corresponding windows 72 and 74. Light sources 60 and 62 can be incorporated into respective illuminators 76 and 78 which, as will be known to those skilled in the art, also include a suitable lamp socket, output ports, and in some instances a reflector to direct the light into the output ports.

Each of the waveguides 65–70 are mounted within the console 12 in concealed locations. They can each be formed as a unitary piece of molded acrylic or other suitable plastic. The design considerations for the waveguides, as well as the process and techniques for construction of the waveguides are well known to those skilled in the art. Furthermore, techniques for providing aesthetically-pleasing lighting of the various receptacles from the output of the waveguides is also known. For example, uniform illumination about the cupholders or storage trays can be achieved by running each of the corresponding waveguides at least partially around the periphery of its associated receptacle.

The front, central waveguide 65 is optically coupled to light source 60 by attaching a first end of the waveguide to one of the output ports of illuminator 76. Waveguide 65 extends from main bin section 16 through cupholder section 18 and to tray section 20. As shown, it includes a trunk section coming from illuminator 76 with branches that route a portion of the light to the receptacles 43, 44, and 52–54 (i.e., to the cupholders 43 and 44, the storage trays 52 and 53, and the electrical socket 54).

The driver's area waveguide 66 is optically coupled to light source 60 and includes a trunk portion that extends from the light source and terminates at two branches that route a portion of the light to the openings 37 and 39 to provide seat buckle and foot well illumination, respectively. Similarly, the front passenger waveguide 67 is optically coupled to light source 60 and includes both a trunk portion and two branches that route a portion of the light to the openings 38 and 40 to provide passenger side seat buckle and foot well illumination, respectively.

The rear, central waveguide 68 is optically coupled to light source 62 by attaching a first end of the waveguide to one of the output ports of illuminator 78. It branches to each of the rear cupholders 31 and 32. The rear left passenger waveguide 69 is a non-branching waveguide that is optically coupled to the light source 62 and that extends to the opening 35 to thereby provide foot well illumination behind the driver's seat. Similarly, rear right passenger waveguide 70 is optically coupled to the light source 62 and extends to the opening 36 to thereby provide foot well illumination behind the front passenger seat.

The exiting of light from the console 12 at each of the openings can be implemented in a number of different ways. For example, as shown in the FIGURE, the openings 39 and 40 that are used for front foot well illumination can be open slots in the console housing which are covered by one or more louvers 80, 82 that baffle the light so that it does not shine upwards towards the occupants' eyes. Optionally, any of the openings can be covered with a lens, such as shown for the seat buckle illumination openings 37 and 38. These lenses 84 and 86 can be constructed to redirect the light as it exits the console so that it may be focussed or dispersed, as desired. Alternatively, a window can be used to simply provide a transparent cover, such as the windows 88 and 90 which are located over the openings 35 and 36. It should be noted that numerous other optical devices, such as various types of lenses, reflective elements, filters, etc., could be used in conjunction with openings 35–40 in order to affect the different light emission patterns. Such devices could conceivably alter the shape, intensity, color or direction of the emitted light.

Normally, it is not desirable to have all of the components and areas that are associated with a single one of the light sources illuminated at the same time. For example, while foot well illumination via openings 39 and 40 may be desirable whenever the vehicle doors are open or when the interior dome light is switched on, it may not be desirable to have those areas illuminated during nighttime driving. However, illumination of cupholders 43 and 44 may be desired while driving. Thus, illumination system 14 includes optical baffles 92 and 94 which can be electronically controlled via an electrical signal from the vehicle's lighting group electronics to selectively enable or disable the transmission of light from the light source 60 to the waveguides 66 and 67. These optical baffles are installed in the optical path between the light source and openings and the selection and use of suitable optical baffles is within the level of those skilled in the art. Optical baffles can also be used to control the light to the rear foot well openings 35 and 36. Finally, to control activation of the light sources 60 and 62 whenever they are not being used for other purposes, the main bin section 16 includes a switch 96 which switches state as the storage bin lid 26 is opened or closed.

As will be appreciated, console assembly 10 can be implemented as a drop-in center console module that includes an integrated illumination system which provides not only feature lighting of various user conveniences on the console, but also area illumination of a region external to the console. Of course, the actual size, shape, and other design features of console 12, including its framework and mounting onto the vehicle, will normally be determined based on the aesthetic and functional design requirements for a particular vehicle application.

It will thus be apparent that there has been provided in accordance with the present invention a central console assembly which achieves the aims and advantages specified herein. It will of course be understood that the foregoing description is of a preferred exemplary embodiment of the invention and that the invention is not limited to the specific embodiment shown. Various changes and modifications will become apparent to those skilled in the art. For example, although console 12 includes a front tray section and cupholder section, it will be appreciated that each of these different sections need not be present, as one or more of these sections can be incorporated together or eliminated. As another example, the light sources can be located at different locations; for example, light sources could be used at some or all of the external openings in the console to provide direct illumination of, for example, the foot wells. Alternatively, the light source(s) can be remotely located away from the console, with a suitable concentration of light being routed to the console from underneath by a waveguide so that the console could be implemented as part of a larger overall distributed lighting system. Accordingly, all such variations and modifications are intended to come within the scope of the appended claims.

I claim:

1. A console assembly for use at a central location within the interior of a vehicle, said console assembly comprising:
    a console having an opaque housing and including a receptacle positioned at a first location on said console, said housing having an opening positioned at a second location on said console, said opening being located on an outer surface of said housing such that when said console is installed within the interior of a vehicle at the central location, said opening is oriented relative to a vehicle interior component so as to permit direct illumination of the interior component from light exiting said opening; and
    an illumination system disposed within said console, wherein said illumination system includes:
        a light source positioned within said console to provide illumination at one of said first and second locations; and
        a waveguide optically coupled to said light source to thereby receive light from said light source said waveguide extending away from said light source toward the other of said first and second locations to thereby conduct the received light toward the other location.

2. A console assembly as defined in claim 1, wherein said light source is positioned proximate said one location and is oriented to provide direct illumination at said one location.

3. A console assembly as defined in claim 2, wherein said light source is positioned proximate said receptacle at said first location and is oriented to directly illuminate said receptacle.

4. A console assembly as defined in claim 3, wherein said receptacle is a storage bin within said console.

5. A console assembly as defined in claim 3, wherein said waveguide extends to said opening and has a light output at said opening to thereby provide external illumination from said console through said opening.

6. A console assembly as defined in claim 3, further comprising a second receptacle and a second waveguide, with said second waveguide being optically coupled to said light source and extending to said second receptacle to thereby provide illumination of said second receptacle.

7. A console assembly as defined in claim 6, wherein said second receptacle is a cupholder.

8. A console assembly as defined in claim 2, wherein said light source is positioned proximate said opening at said second location and is oriented to provide external illumination from said console through said opening.

9. A console assembly as defined in claim 1, wherein said waveguide comprises a first waveguide and wherein the illumination assembly further comprises a second waveguide optically coupled to said light source to receive light from said light source, said second waveguide extending from said light source toward said one location, whereby light from said light source is conducted by said first and second waveguides to said receptacle and said opening.

10. A console assembly as defined in claim 9, wherein said second waveguide comprises a branch of said first waveguide.

11. A console assembly as defined in claim 1, wherein said console includes a storage bin, with said opening comprising a first opening in said storage bin, and wherein said storage bin includes a second opening that receives light from said light source, said second opening being located on an inner surface of said storage bin, whereby light exiting said second opening provides illumination within said storage bin.

12. A console assembly as defined in claim 1, wherein said opening is positioned on said console to provide foot well illumination when said console is installed at the central location within the vehicle.

13. A console assembly as defined in claim 1, wherein said opening is positioned on said console to provide seat buckle illumination when said console is installed at the central location within the vehicle.

14. A console assembly as defined in claim 1, further comprising a second opening, wherein said waveguide supplies light from said light source to at least one of said openings.

15. A console assembly as defined in claim 1, wherein said receptacle comprises a storage tray.

16. A console assembly as defined in claim 1, wherein said receptacle comprises a cupholder.

17. A console assembly as defined in claim 1, wherein said receptacle comprises an electrical socket.

18. A console assembly as defined in claim 1, wherein said receptacle comprises a storage bin.

19. A console assembly as defined in claim 1, wherein, when said console is installed in the central location within the vehicle, said illumination system provides area illumination of a region external to said console via passage of light through said opening and provides feature lighting of said receptacle at said first location.

20. A console assembly as defined in claim 1, wherein light from said light source travels between said light source and first location along a first optical path and travels between said light source and said second location along a second optical path, and wherein the illumination system further comprises an optical baffle located in one of said optical paths, said optical baffle being operable in response to an electrical signal to selectively enable or disable the transmission of light along said one path.

21. A console assembly as defined in claim 1, wherein said housing comprises a storage bin housing.

22. A console assembly as defined in claim 1, wherein said housing comprises a cupholder housing.

23. A console assembly as defined in claim 1, wherein said housing comprises a storage tray housing.

24. A console assembly as defined in claim 1, wherein said housing comprises an integrated storage bin housing and cupholder housing.

25. A console assembly as defined in claim 1, wherein said housing comprises an integrated storage bin housing, cupholder housing, and storage tray housing.

* * * * *